United States Patent [19]
Kajiwara et al.

[11] Patent Number: 5,925,947
[45] Date of Patent: *Jul. 20, 1999

[54] TOTALLY-ENCLOSED TYPE MOTOR

[75] Inventors: Kenzo Kajiwara; Kouki Nagai, both of Hitachi; Kenji Takahashi, Abiko; Heikichi Kuwahara, Tsuchiura, all of Japan

[73] Assignee: Hitachi, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/749,941

[22] Filed: Nov. 14, 1996

[30] Foreign Application Priority Data

Nov. 27, 1995 [JP] Japan ................................. 7-307125

[51] Int. Cl.$^6$ .................................................. H02K 19/06
[52] U.S. Cl. ................................ 310/64; 310/89; 310/62; 310/63; 310/58
[58] Field of Search .................................. 310/62, 89, 64, 310/63, 216, 58

[56] References Cited

U.S. PATENT DOCUMENTS 4,668,898  5/1987  Harms et al. ........................... 318/254

FOREIGN PATENT DOCUMENTS

| 046315 | 2/1982 | European Pat. Off. | 310/62 |
| 072999 | 3/1983 | European Pat. Off. | 310/62 |
| 407785 | 1/1923 | Germany | 310/62 |
| 1882592 | 11/1963 | Germany | 310/62 |
| 2233860 | 2/1973 | Germany | 310/62 |

*Primary Examiner*—Thomas M. Dougherty
*Assistant Examiner*—K. I. E. Tamai
*Attorney, Agent, or Firm*—Antonelli, Terry, Stout & Kraus, LLP

[57] ABSTRACT

An interior cooling air flow is moved by an interior fan through an inside ventilation passage provided on an inside surface of a stator frame of a totally-enclosed type motor. An exterior cooling air produced by an exterior fan is passed through an outside surface of ventilation passage provided on an outside the stator frame. An inner heat radiation rib is provided in the axial direction on an inner face the inside ventilation passage so that the temperature rise of the motor can be reduced by an improvement in the cooling characteristic. In this way, a compact size totally-enclosed type motor having an improved cooling characteristic is obtained.

6 Claims, 7 Drawing Sheets

(HEAT AMOUNT HEAT-RADIATED BY INNER AIR CIRCULATION THROUGH STATOR FRAME / HEAT AMOUNT HEAT-RADIATED FROM STATOR CORE BY HEAT CONDUCTION THROUGH STATOR FRAME)

FIG. 8

(AREA OF STATOR FRAME INNER FACE VENTILATION HEAT-RADIATION RIB / CONTACT AREA OF STATOR FRAME AND STATOR CORE)

ced type motor

TOTALLY-ENCLOSED TYPE MOTOR

BACKGROUND OF THE INVENTION

The present invention relates to a totally-enclosed type motor and, in particular, to a totally-enclosed type motor having an interior cooling passage system, in which cooling air circulated by an interior fan passes through an inside ventilation passage of a stator frame, and an exterior cooling passage system, in which cooling air provided by an exterior fan passes through an outside ventilation passage of the stator frame.

Figure 4A:
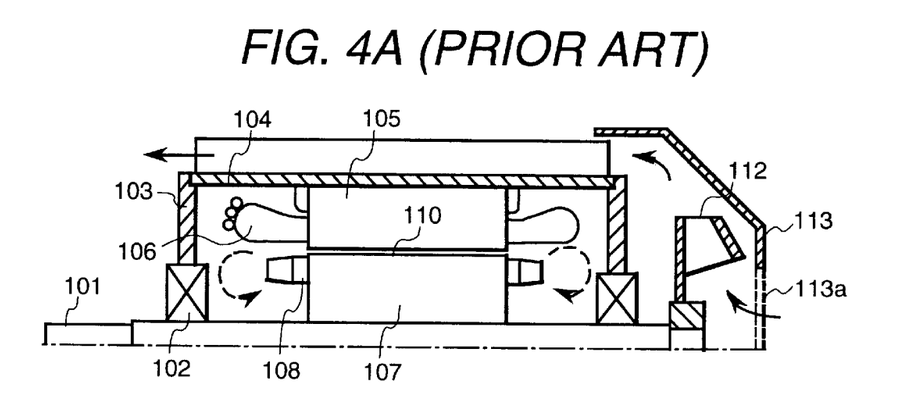
FIG. 4A is an axial longitudinal cross-sectional view showing one example of a totally-enclosed type motor according to the prior art.
Figure 4B:
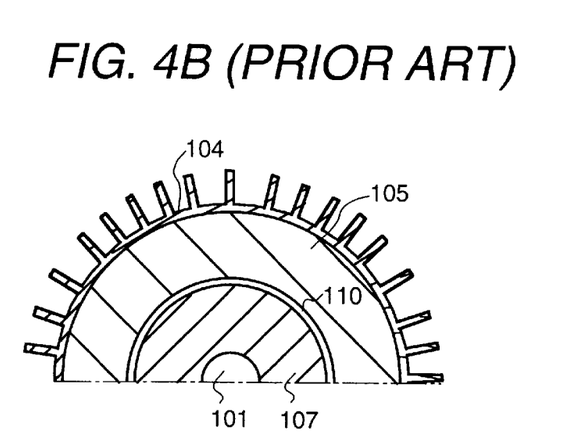
FIG. 4B is a transverse cross-sectional view of the motor of FIG. 4A.

The general structure of a conventional totally-enclosed type motor is shown in FIG. 4A and FIG. 4B. As shown in FIG. 4A and FIG. 4B, the conventional totally-enclosed type motor structure is roughly constituted by a rotor shaft 101, a rotor core 107 having a rotor winding 108, and a stator core 105, which is arranged around the outside of the rotor core 107, is separated therefrom by an air gap 110 and has a stator winding 106. The conventional totally-enclosed type motor structure is roughly constituted further by two bearing members 102 for rotatively supporting the rotor shaft 101, two bracket members 103 for closing the axial ends of the stator frame 104, an exterior fan 112 which is arranged on the shaft 101 outside of the bracket member 103, and an end covering member 113 for covering the exterior fan 112.

With a conventional totally-enclosed type motor of the above stated construction, almost all heat loss, which is generated in the stator core 105, the stator winding 106, the rotor core 107 and the rotor winding 108, is heat-transferred to the stator frame 104 through the stator core 105 by heat conduction. Further, as a result of a fan operation produced by an end portion of the rotor winding 108, as shown by a dotted line arrow in FIG. 4A, the interior air is agitated and heat is transferred to an inner face of the stator frame 104 and an inner face of the bracket member 103 through heat conduction. Therefore, a part of the heat loss is heat-transferred to the stator frame 104 through heat conduction. The heat being heat-transferred to the stator frame 104 is heat-radiated toward the outside of the motor and is conducted away by the exterior cooling air flow, as shown with a solid line arrow in FIG. 4A, produced by the exterior fan 112.

Figure 5A:
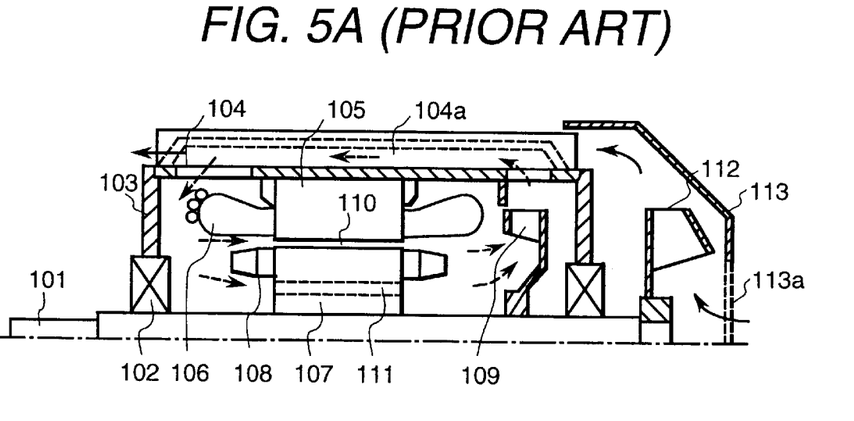
FIG. 5A is an axial longitudinal cross-sectional view showing another example of a totally-enclosed type motor according to the prior art.
Figure 5B:
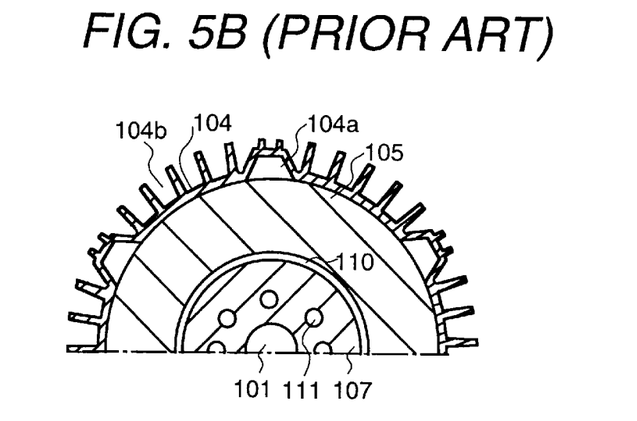
FIG. 5B is a transverse longitudinal cross-sectional view of the motor of FIG. 5A.

Another structure of a conventional totally-enclosed type motor is shown in FIG. 5A and FIG. 5B, and such a totally-enclosed type motor is disclosed, for example, in Japanese utility model laid open No. 88,454/1987. The totally-enclosed type motor structure shown in FIG. 5A and FIG. 5B differs from the totally-enclosed type motor shown in FIG. 4A and FIG. 4B in the following points.

The stator frame 104 of this totally-enclosed type motor structure has plural inside ventilation passages 104a, plural outside ventilation passages 104b, and an interior fan 109. The inside ventilation passages 104a are formed by the inside surface of the stator frame 104 and are spaced with a predetermined interval in the peripheral direction, as seen in FIG. 5B, and extend continuously in the axial direction, as seen in FIG. 5A. The outside ventilation passages 104b are provided on an outside surface of the stator frame 104 and extend continuously in the axial direction and are spaced in the peripheral direction between adjacent inside ventilation passages 104a, as seen in FIG. 5B. The interior fan 109 is arranged in the stator frame 104, so that by rotating the fan 109 together with the rotor shaft 101, the interior cooling air, which has cooled the stator core 105 and the rotor core 107, is sent out and is circulated through the inside ventilation passages 104a.

Two flows of cooling air are produced in the totally-enclosed type motor structure as shown by the arrows in FIG. 5A. First of all, the interior cooling air flow, which has been produced by the interior fan 109, as shown with dotted line arrows in FIG. 5A, passes through the inside ventilation passages 104a which are formed at the inner face of the stator frame 104. After that, the interior cooling air is distributed and passed through the air gap 110 and axial ducts 111. The interior cooling air then is returned again to the interior fan 109 and is continuously circulated.

Further, the exterior cooling air flow, as shown by solid line arrows in FIG. 5A, is drawn into an air inlet port 113a, which is provided on the end covering member 113 by the exterior fan 112. The exterior cooling air passes through the outside ventilation passages 104b, which are provided at an outside portion of the stator frame 104, and is then discharged to the outside.

A further conventional totally-enclosed type motor structure is disclosed in, for example, Japanese utility model laid-open No. 113,562/1989. This conventional totally-enclosed type motor structure is shown in FIG. 6A, FIG. 6B and FIG. 6C.

Figure 6A:
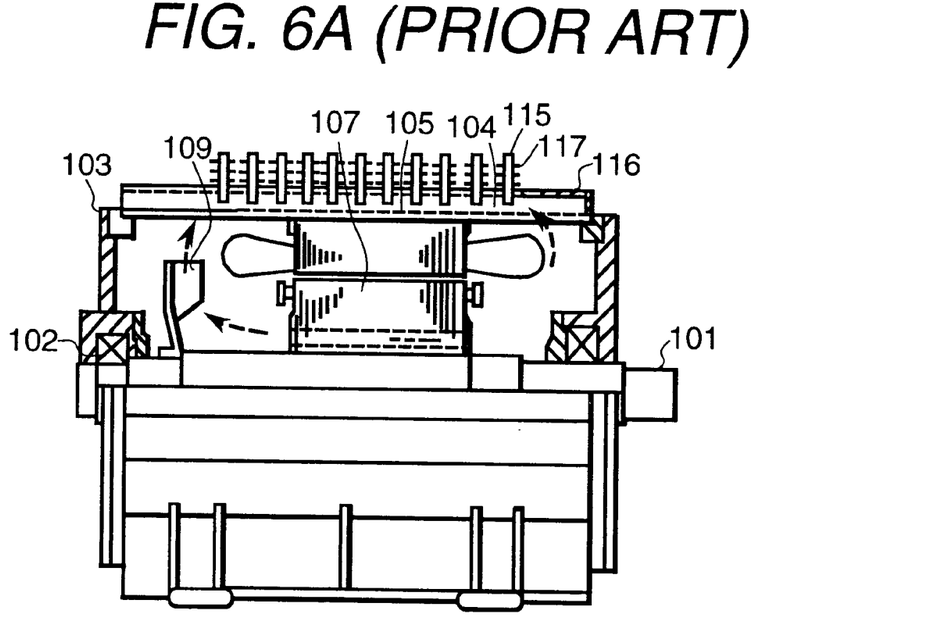
FIG. 6A is an axial longitudinal cross-sectional view showing a further example of a totally-enclosed type motor according to the prior art.
Figure 6B:
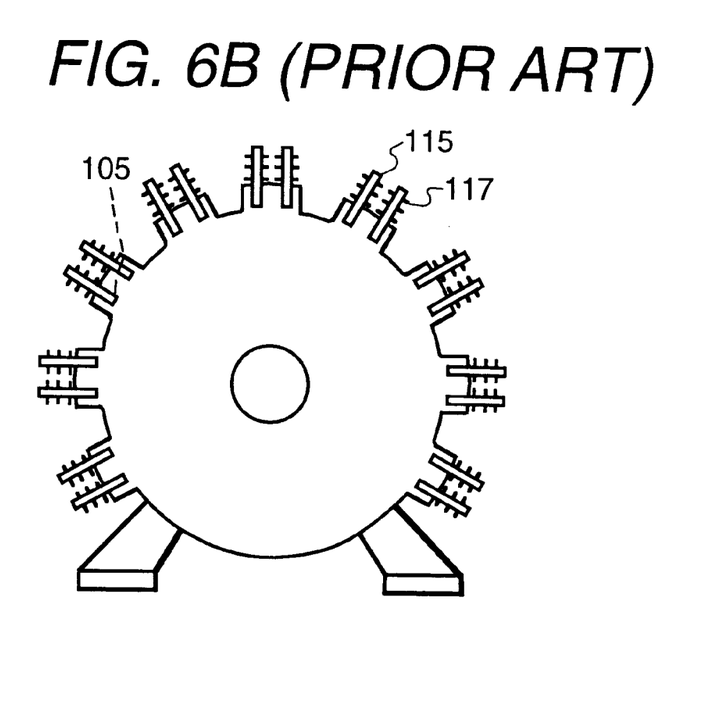
FIG. 6B is a side view of the motor of FIG. 6A.
Figure 6C:
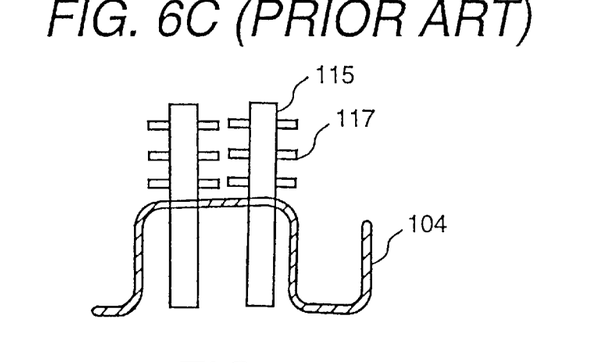
FIG. 6C is a partially enlarged view of the motor of FIG. 6B.

In the totally-enclosed type motor structure shown in FIG. 6A, FIG. 6B and FIG. 6C, the motor has no exterior fan, in contrast to the above stated former totally-enclosed type motor structures. In place of the exterior fan, in the totally-enclosed type motor structure shown in FIG. 6A, FIG. 6B and FIG. 6C, one end of a heat pipe 115 is projected toward and into the interior of the inside ventilation passage 104a. Plural heat radiation fins 117 are provided on the heat pipe 115 and are arranged on opposite sides of the inner projected heat pipe 115 so as to extend toward the outside of the inside ventilation passage 104a of the heat pipe 115 or outside of an outer frame 116. With the above stated totally-enclosed type motor structure, as shown in FIG. 6A, FIG. 6B and FIG. 6C, an enlargement of the heat-receiving area is attained by the provision of the heat pipe 115 having plural heat radiation fins 117.

In the conventional totally-enclosed type motor structure shown in FIG. 4A and FIG. 4B, since the interior cooling air is merely agitated, the amount of heat radiation is extremely small. As one example, the amount of heat radiation produced by the agitation is about 12% of the total heat radiation as one calculation example. Thus, the conventional totally-enclosed type motor structure shown in FIG. 4A and FIG. 4B has a defect in that there is a serious limitation on the heat transfer amount possible with this construction.

Further, in the conventional totally-enclosed type motor structure shown in FIG. 5A and FIG. 5B, the motor has two paths along which heat is transferred to the stator frame 104, these two paths providing for heat conduction (A) from the stator core 105 and heat transfer (B) due to the interior cooling air flow. The temperature rise in the motor is influenced by the total heat transfer resulting from the amount of the above stated heat conduction (A) added to the amount of the above stated heat transfer (B). For example, the heat conduction (A) can be made large by increasing the area of contact of the stator core 105 and the stator frame 104, however the heat transfer amount due to the heat transfer (B) will be small as a result. On the other hand, the heat transfer (B) can be made large by increasing the size of the inside ventilation passage 104a or the number thereof, however the heat transfer amount due to the heat conduction (A) will be made small as a result. Accordingly, the conventional totally-enclosed type motor structure shown in FIG. 5A and FIG. 5B has a defect in that there is a serious limitation on the heat transfer amount in the motor having such a construction.

Further, in the conventional totally-enclosed type motor structure shown in FIG. 6A, FIG. 6B and FIG. 6C, the heat radiation fins 117 are mounted on one side of the heat pipe 115 and are formed at the outside of the stator frame 104. The pitch in the axial direction of the arrangement of the heat pipes 115 is at least more than an outer diameter of the heat radiation fins 117, therefore there is a serious limitation on any increase in the heat-receiving area in the motor having this construction. Further, since there is no cooling fan provided outside of the stator frame 104, the heat removal is caused only by natural heat radiation, and therefore, there is a serious limitation on the heat transfer in the motor having this construction.

SUMMARY OF THE INVENTION

An object of the present invention is to provide a totally-enclosed type motor wherein a high cooling efficiency can be obtained without a reduction in the amount of heat transfer from the stator core to the stator frame.

Another object of the present invention is to provide a totally-enclosed type motor wherein a high cooling efficiency can be obtained by increasing the amount of heat transferred to a stator frame due to the interior circulation of cooling air.

According to the present invention, a totally-enclosed type motor comprises a substantially cylindrical stator frame having plural inside ventilation passages, which are spaced with a predetermined interval in the peripheral direction and continuously extend in the axial direction, and plural outside ventilation passages, which are formed between the inside ventilation passages in the peripheral direction, a stator core fitted into the stator frame and having a stator winding, a rotor core arranged in the stator core with a predetermined space therebetween and fitted onto a rotor shaft and having a rotor winding, bearing members for rotatively supporting the rotor shaft, bracket members for closing both ends in the axial direction of the stator frame with the stator core and the rotor core being located inside the stator frame, an interior fan arranged in the closed stator frame and rotating together with the rotor shaft for circulating out and circulating interior cooling air through the inside ventilation passages to cool the stator core and the rotor core, and an exterior fan arranged outside of the stator frame and rotating together with the rotor shaft for sending out exterior cooling air through the outside ventilation passages.

Preferably, at least one heat radiation rib extends continuously in the axial direction on an inner face of the inside ventilation passage of the stator frame. Plural heat radiation ribs also may extend continuously in the axial direction and have an undulating shape on an inner face of the inside ventilation passage of the stator frame.

The number of the heat radiation ribs provided on the inner face of the inside ventilation passage of the stator frame is set within a range of 5–12, and at least one heat radiation rib extends continuously in the axial direction on an inner face of each of the inside ventilation passages of the stator frame.

The ratio between the area of the heat radiation ribs provided on the inner face of the inside ventilation passage of the stator frame and the contact area between the stator frame and the stator core is set within a range of 1.5–5.

The ratio between the amount of heat being removed by cooling air circulated by the interior fan through the stator frame and through the inside ventilation passage of the stator frame and the amount of heat being removed from the rotor core due to the heat conduction through the stator frame is set within a range of 0.4–0.65.

According to the present invention, a totally-enclosed type motor comprises a substantially cylindrical stator frame having plural inside ventilation passages, which are spaced with a predetermined interval in the peripheral direction, the inside ventilation passages forming a raised portion outside of the stator frame and extending continuously in the axial direction, and plural outside ventilation passages, which are formed between the inside ventilation passages in the peripheral direction. At least one inner heat radiation rib extends continuously in the axial direction on an inner face of the inside ventilation passage and is oppositely arranged with respect to at least one outer heat radiation rib which is provided on an outer face of the inside ventilation passage.

With the totally-enclosed type motor structure according to the present invention, since at least one heat radiation rib extends continuously in the axial direction on the inner face of the inside ventilation passage of the stator frame, an increase in the cooling area in the motor can be attained. Also, since the totally-enclosed type motor structure according to the present invention has an exterior fan, the heat being heat-transferred to the stator frame is heat-transferred to the exterior cooling air flow, whereby the cooling effect in the motor can be heightened. Further, because of the way the inner air ventilation and circulation passage system is formed, the amount of heat being transferred to the stator frame is increased by the heat transfer performed by the interior cooling air, whereby the cooling efficiency in the motor can be heightened.

Accordingly, without any reduction in the amount of heat transfer due to heat conduction from the stator core to the stator frame, the heat transferring area in the inner face of the stator frame is increased and the heat resistance in the motor is reduced. Therefore, the temperature rise in the totally-enclosed type motor can be reduced and an improvement in the cooling efficiency in the motor can be attained.

Further, when the number of inside ventilation passages in the stator frame is too many, the fitting-into area between the stator frame and the stator core is reduced. Since the contact heat resistance of the fitting-into area increases in this case, the temperature rise in the motor will be heightened. Accordingly, there is a range for optimizing the number of inside ventilation passages. As a result of a ventilation and a heat transfer analysis, such an optimum number of inside ventilation passages should be set within a range of 5–12.

Further, the ratio between the amount of heat being radiated from the stator core and passing through the stator frame and the amount of heat being transferred first to the inside air and then being heat-radiated has an optimum range. The stator winding temperature varies due to the ratio of these heat radiation amounts. In a case where the ratio of the heat radiation amounts is in a range of 0.4–0.65, the stator winding temperature is lowest, and so a high cooling performance in the motor can be obtained.

Further, the heat-radiating area of the heat radiation rib provided on the inner face in the inside ventilation passage has an optimum range, this optimum range for the ratio of the contact area between the stator frame and the stator core being 1.5–5, and so a high cooling performance in the motor can be obtained.

DESCRIPTION OF THE INVENTION

Figure 1A:
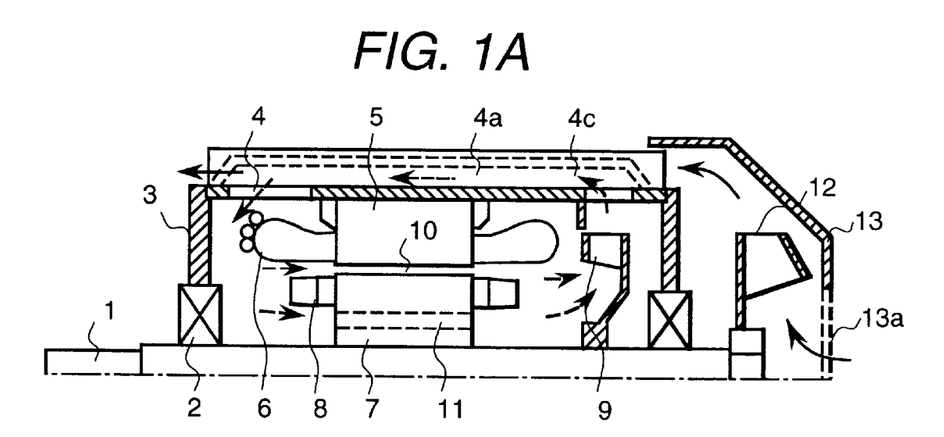
FIG. 1A is an axial longitudinal cross-sectional view showing one embodiment of a totally-enclosed type motor according to the present invention.
Figure 1B:
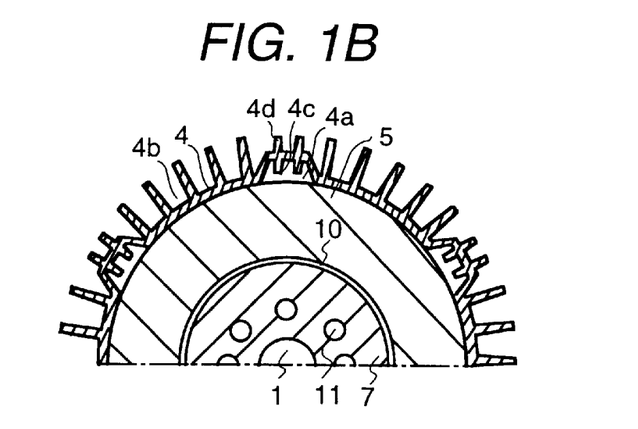
FIG. 1B is a transverse cross-sectional view showing one embodiment of a totally-enclosed type motor according to the present invention.

Hereinafter, one embodiment of a totally-enclosed type motor according to the present invention will be explained with reference to the drawings. FIG. 1A and FIG. 1B show one embodiment of a totally-enclosed type motor according to the present invention.

As shown in FIG. 1A and FIG. 1B, one embodiment of the totally-enclosed type motor structure according to the present invention is constituted by a rotor shaft 1, a rotor core 7 fitted onto the rotor shaft 1 and having a rotor winding 8, and a stator core 5, which is arranged around the outside of the rotor core 7 with a predetermined air gap 10 therebetween and has a stator winding 6, an outer peripheral face of the stator core 5 being fitted against an inner face of a substantially cylindrical stator frame 4.

The totally-enclosed type motor structure according to the present invention is constituted further by two bearing members 2 for rotatively supporting the rotor shaft 1, two bracket members 3 for closing the axial ends of the stator frame 4 with the stator core 5 and the rotor core 7 located within the stator frame 4, and an interior fan 9 which is mounted on the shaft 1 and arranged inside of the bracket member 3.

The totally-enclosed type motor structure according to the present invention is constituted further by an exterior fan 12 which is arranged outside of the bracket member 3 and is rotated by the rotor shaft 1 so that a flow of exterior cooling air is sent to an outside ventilation passage 4b which is formed on an outer periphery of the stator frame 4. An end covering member 13 is provided for covering the exterior fan 12 and for guiding the flow of exterior cooling air produced by the exterior fan 12 toward the outside ventilation passage 4b.

In this embodiment of the totally-enclosed type motor according to the present invention, the stator frame 4 has plural inside ventilation passages 4a, plural outside ventilation passages 4b, plural inner heat radiation ribs 4c, and plural outer heat radiation ribs 4d.

The inside ventilation passages 4a are provided on an inside portion of the stator frame 4 and are formed with a predetermined interval in the peripheral direction, while extending continuously in the axial direction.

The outside ventilation passages 4b are provided on an outside portion of the stator frame 4 and extend continuously in the axial direction, being spaced in the peripheral direction between adjacent inside ventilation passages 4a. The outside ventilation passages 4b are each formed between two adjacent straight long ribs which extend in the radial direction from the stator frame 4.

The interior fan 9 is arranged in the stator frame 4 and is rotated by the rotor shaft 1 so that the interior flow of cooling air which has cooled the stator core 5 and the rotor core 7 is conveyed out and is circulated through the inside ventilation passages 4a.

The two outer heat radiation ribs 4d are integrally formed at the outer face on the inside ventilation passage 4a. These outer heat radiation ribs 4d have a tip end which extends to the same position in the radial direction as the tip ends of the straight shape long ribs which form the outside ventilation passages 4b. In other words, the tip ends of the outer heat radiation ribs 4d and the tip ends of the straight shape long ribs are all positioned on a cylindrical locus.

The two inner heat radiation ribs 4c are integrally and continuously provided in the axial direction on the inner face of the inside ventilation passage 4a and are oppositely arranged with respect to the outer heat radiation ribs 4d, which are integrally provided on the outer face of the inside ventilation passage 4a.

As shown in FIG. 1A and FIG. 1B, in this embodiment of the totally-enclosed type motor according to the present invention, there are six inside ventilation passages 4a, and two heat radiation ribs 4c are provided on each inside ventilation passage 4a. The six inside ventilation passages 4a are formed in the outside portion of the stator frame 4 and have a dent shape extending outwardly in a radial direction toward the outside of the stator frame 4. The six inside ventilation passages 4a are formed to have a predetermined interval in the peripheral direction. The two inner heat radiation ribs 4c extend continuously in the axial direction in the inside ventilation passages 4a.

The various flows of cooling air in the above stated totally-enclosed type motor structure will be explained. First of all, the flow of the interior cooling air is shown as dotted line arrows in FIG. 1A. After the interior flow of cooling air produced by the interior fan 9 passes through the inside ventilation passages 4a, which are provided on the inside of the stator frame 4, the cooling air is distributed and ventilated to the air gap 10 and the axial ducts 11, and this interior cooling air is returned again to the interior fan 9.

Further, the exterior flow of cooling air is shown by the solid line arrows in FIG. 1A. The exterior fan 12 causes cooling air to flow in from the air inlet port 13a, which is provided on the end covering member 13, and to be discharged after passing through the outside ventilation passages 4b, which are provided on the outside portion of the stator frame 4.

Next, the flow of the heat will be explained. The heat loss (hereinafter referred to as "motor interior generated heat loss") involves the stator core 5, the stator winding 6, the rotor core 7 and the rotor winding 8. The motor interior generated heat loss comprises heat which is heat-transferred to the stator frame 4 through the stator core 5 by heat conduction and heat which is transferred through the interior cooling air produced by the interior fan 9 by heat transfer. The motor interior generated heat loss, which is transferred to the stator frame 4, is heat-radiated and discharged to the outside of the motor by the exterior cooling air flow produced by the exterior fan 12.

Herein, according to this embodiment of the present invention, since the inner heat radiating rib 4c extends continuously in the axial direction in the inside ventilating passage 4a of the stator frame 4, the heat-transferring area is increased. As a result, the motor interior generated heat loss, which is heat-transferred to the interior cooling air flow, is more effectively heat-transferred to the stator frame 4. Further, since the motor has the exterior fan 12, the heat being heat-transferred to the stator frame 4 is heat-transferred to the exterior cooling air flow, and so the cooling efficiency in the motor can be heightened. Finally, since six inner air ventilation circulation passages are provided, the amount of heat conducted to the stator frame 4 by heat transfer is increased by the interior cooling air flow, and so the cooling efficiency in the motor can be heightened.

Accordingly, without any reduction in the contact area between the stator core 5 and the stator frame 4, in other words without any increase in the resistance to heat flow from the stator core 5 to the stator frame 4 by heat conduction, the resistance to heat being transferred to the stator frame 4 by heat transfer can be reduced by the interior cooling air flow. As a result, the temperature rise in the motor can be reduced.

According to actual measurement by the inventors of the present invention, the temperature rise in the stator winding 106 of the prior art arrangement shown in FIG. 4A and FIG. 4B was 135° C., while the temperature rise in the stator winding 6 according to this embodiment of the present invention, where six inner air ventilation circulation passages having inner heat radiation ribs 4c are provided was 88° C. Thus, it can be seen that the temperature rise of the embodiment according to the present invention was reduced by 35% in comparison with the above stated prior art motor structure.

Further, the temperature rise in the stator winding 106 according to the prior art arrangement shown FIG. 5A and FIG. 5B was 102° C., while the temperature rise in the stator winding 6 according to this embodiment of the present invention, where six inner air ventilation circulation passages are provided, was 88° C. Thus, it can be seen that the temperature rise of the embodiment according to the present invention was reduced by 14% in comparison with the above stated prior art motor structure.

Further, the temperature rise in the stator winding 106 according to the prior art arrangement shown in FIG. 6A, FIG. 6B and FIG. 6C can be assumed to be at at least 180° C., so that it is understood that the effects obtained by the embodiment according to the present invention are clearly more favorable than those of the prior art.

Figure 2:
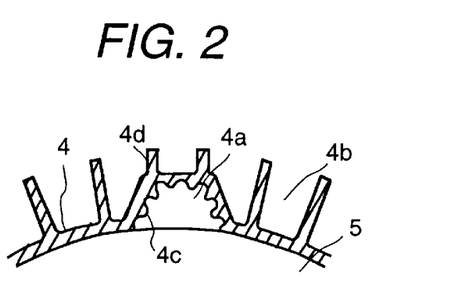
FIG. 2 is a partial view in cross-section showing another embodiment of a totally-enclosed type motor according to the present invention.

Another embodiment of a totally-enclosed type motor according to the present invention will be explained with reference to FIG. 2. In this embodiment, the inside ventilation passage 4a of the stator frame 4 is formed in a wave or undulating shape on the inner face of the inside ventilation passage 4a. Therefore, plural inner heat radiation ribs 4c are integrally and continuously formed in the axial direction by the inner projecting portions or protruding portions of the member.

Further, fatigue can cause the inner heat radiation rib 4c in the inside ventilation passage 4a of the stator frame 4 to twist along the axial direction, or the surface of the inner heat radiation rib 4c can be formed intentionally with an uneven shape. Finally, the number of inner heat radiation ribs 4c can be increased. With the above stated various totally-enclosed type motor structures, similar effects as those stated in the above two embodiments according to the present invention can be obtained.

Figure 3:
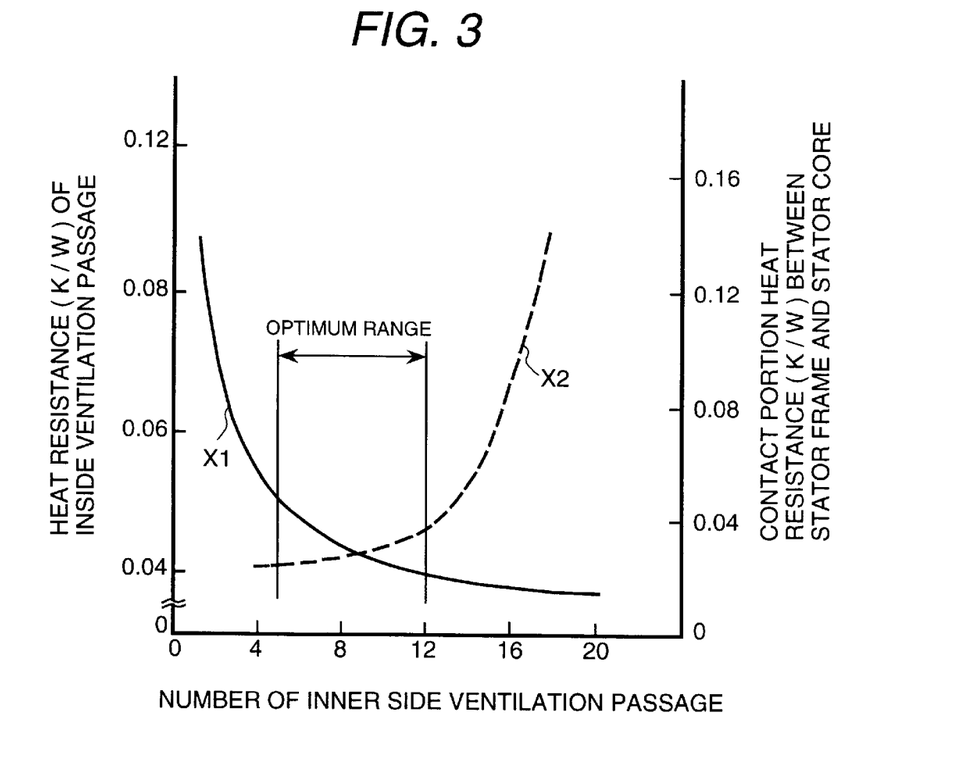
FIG. 3 is a heat conduction characteristic for one embodiment of a totally-enclosed type motor according to the present invention and is a characteristic diagram showing heat resistance of an inside ventilation passage and the contact heat resistance between a stator frame and a stator core with respect to the number of inside ventilation passages.

FIG. 3 represents one calculation example showing the contact heat resistance of the stator frame 4 and the stator core 5 and the passage heat resistance at the inside ventilation passage 4a with respect to the number of inside ventilation passages 4a of the stator frame 4 in a totally-enclosed type motor in which the stator core 5 has an outer diameter of 300 mm–1000 mm.

In FIG. 3, the heat resistance (K/W) of the inside ventilation passage 4a is shown at the left side along the vertical axis and the contact heat resistance (K/W) is provided at the right side along the vertical axis. Further, the number of inside ventilation passages 4a is shown along the horizontal axis. The heat resistance (K/W) of the inside ventilation passage 4a is indicated by a solid line curve X1 and the contact portion heat resistance (K/W) between the stator frame 4 and the stator core 5 is indicated by a dotted line curve X2.

The totally-enclosed type motor has two paths of heat transfer to the stator frame 4, one of which is the heat conduction path (A) from the stator core 5 and another of which is the heat transfer path involving the interior cooling air flow. In a case where the number of inside ventilation passages 4a is too few, as shown by the solid line curve X1, the amount of heat conducted by heat transfer to the inner face of the stator frame 4 by the interior cooling air flow becomes small. In other words, the ventilation passage heat resistance increases, and the temperature rise in the motor is heightened. In a case where the number of inside ventilation passages 4a is too many, as shown by the dotted line curve X2, the fitting-into area between the stator frame 4 and the stator core 5 is reduced, and so the contact heat resistance increases, and the temperature rise in the motor is heightened. As a result, to satisfy the above stated lower heat resistance conditions, there is a range for optimizing the number of inside ventilation passages 4a. FIG. 3 shows the results of an analysis concerning ventilation and heat transfer in the motor.

As clearly shown in FIG. 3, the number of inside ventilation passages 4a for satisfying both lower heat resistance conditions is set within a range of 5–12, whereby, as a whole, the temperature rise in the motor can reduced. In other words, by increasing the cooling efficiency, the temperature rise in the motor is reduced, therefore the reliability of the motor can be heightened. Typically, the temperature rise of a motor has a normal value as a standard, so that in case of a design in which the temperature rise is set to be the standard value, the motor size can be reduced.

Next, with respect to the inner air ventilation circulation passage system, the inventors of the present invention considered that the motor has an optimum range for the ratio between the amount of heat to be radiated from the stator core 5 through the stator frame 4 and the amount of heat to be transferred first to the inside air and then heat-radiated. Further, the inventors of the present invention examined the temperature rise in the stator winding 6 by varying the ratio of the heat radiation amount. The results are shown in FIG. 7.

Figure 7:
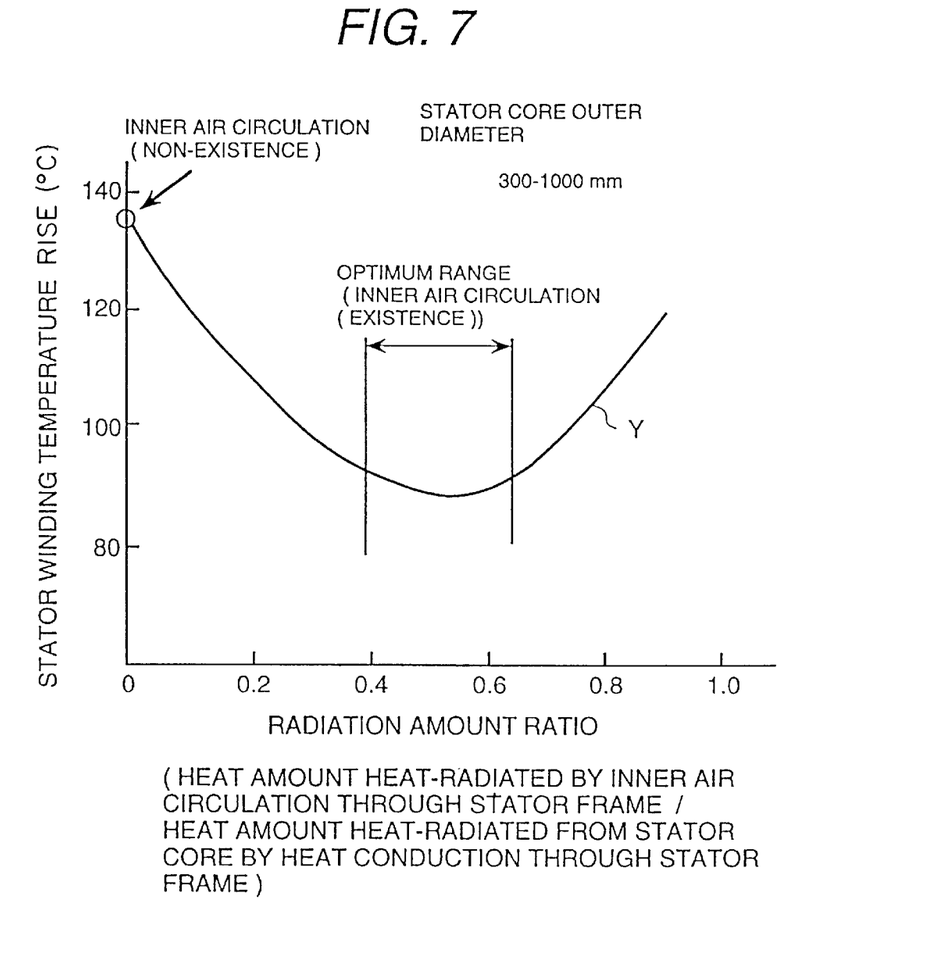
FIG. 7 is a characteristic diagram showing stator winding temperature rise according to a heat radiation amount ratio in one embodiment of a totally-enclosed type motor according to the present invention.

As shown in FIG. 7, the temperature rise in the stator winding 6 varies due to the ratio of the heat radiation amount, the temperature rise in the stator winding 6 being lowest when the ratio of the heat radiation amount is in a range of 0.4–0.65, in which range a high cooling performance in the motor can be attained.

In a totally-enclosed type motor having a stator core with an outer diameter of 300 mm–1000 mm, to establish a ratio of heat radiation amount which is more than 0.65, it is necessary to provide many flow passages in the stator frame 4. However, this causes the range of the contact area of the between the stator core and the stator frame to become small, and so such an arrangement will increase the temperature rise in the stator winding 6.

As clearly shown by the solid line curve Y in FIG. 7, the inventors of the present invention found that, by increasing the contact area between the stator core 5 and the stator frame 4, and by also increasing the amount of heat to be radiated from the inside air, it is necessary to increase the ratio of the amount of heat being radiated from the inside air to more than half the amount of heat to be radiated from the stator core 5 through the stator frame 4. Accordingly, when the totally-enclosed type motor does not provide many cooling air passages in the stator frame 4, it is necessary to lower the heat resistance of the cooling air flow passage in the stator frame 4. As a countermeasure to the above stated facts, the inner heat radiation ribs 4c are integrally mounted on the inside of the cooling air flow passage in the stator frame 4, so that the heat resistance of the cooling air flow passage in the stator frame 4 is lowered.

In the case of the inner air ventilation circulation passage system according to the prior art, a heat radiation rib is not mounted on the inside of the cooling air flow passage in the stator frame. As a result, in the prior art, the ratio of the heat radiation amount is set within a range of 0.2–0.3, and the cooling efficiency in the motor does not significantly differ from the arrangement having no inner air ventilation circulation passage system at all.

Further, in a totally-enclosed type motor having a stator core 5 with an outer diameter of 300 mm–1000 mm, the heat radiation area of the inner heat radiation rib 4c provided on the inner face of the inside ventilation passage 4a is within an optimum range.

Figure 8:
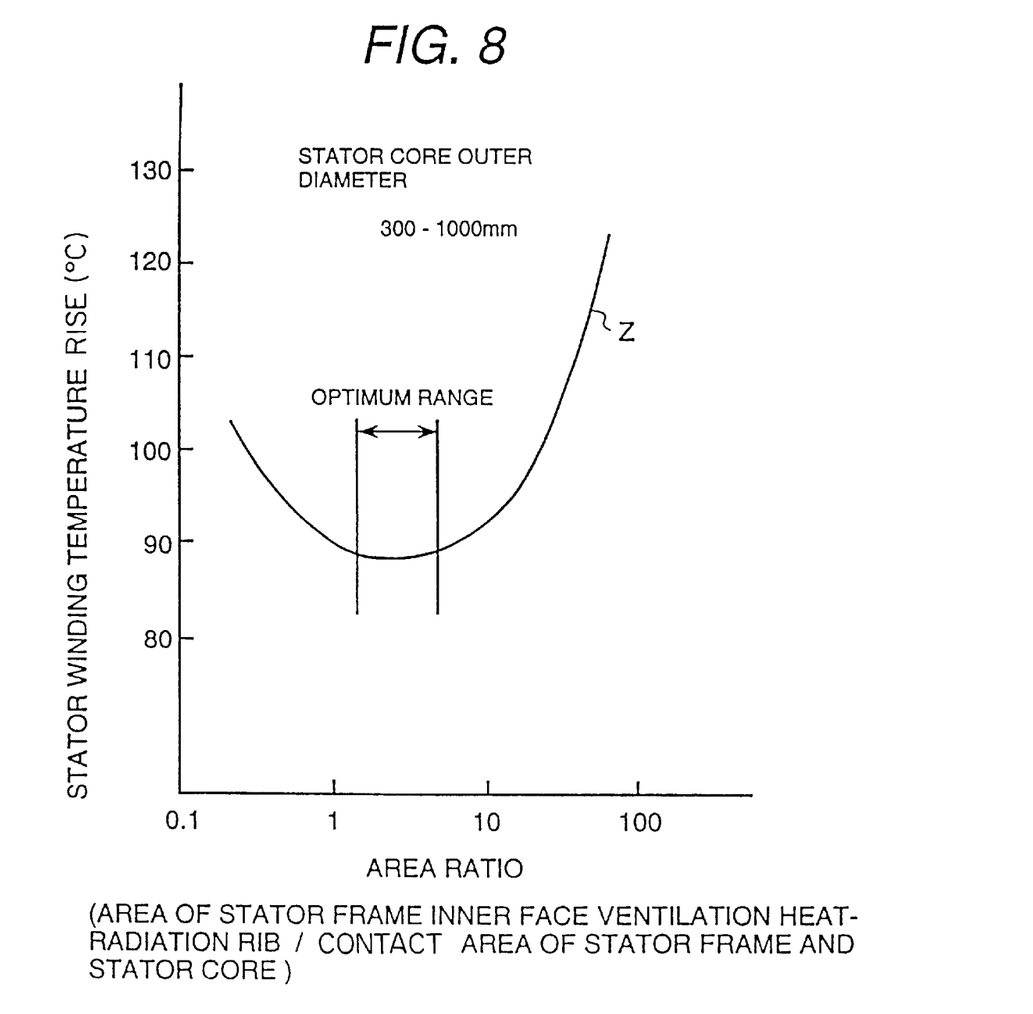
FIG. 8 is a characteristic diagram showing stator winding temperature rise according to an area ratio in one embodiment of a totally-enclosed type motor according to the present invention.

As shown by the solid line curve Z in FIG. 8, the ratio between the heat radiation area of the inner heat radiation rib 4c provided in the inside ventilation passage 4a and the contact area between the stator core 5 and the stator frame 4 has an optimum range of 1.5–5. In other words, it is necessary to increase the area of the inner heat radiation rib 4c in the inside ventilation passage 4a more than the fitting-into area between the stator core 5 and the stator frame 4. In this case, both the amount of heat being radiated through the inside air and the amount of heat being radiated from the stator core 5 through the stator frame 4 have optimum ranges.

Since the inner heat radiation rib is integrally and continuously provided in the axial direction on the inner face of the inside ventilation passage of the stator frame, an increase in the cooling area can be attained. Further, since the motor has an exterior fan, since the heat being heat transferred to the stator frame is transferred to the exterior cooling air flow, the cooling effect in the motor can be heightened. Also, since an inner air ventilation circulation passage system is provided, the amount of heat transferred to the stator frame by the interior cooling air flow is increased, and so the cooling efficiency in the motor can be heightened.

Further, in a case where the number of inside ventilation passages in the stator frame is too many, the fitting-into area between the stator frame and the stator core is reduced. Since this causes the contact heat resistance of the fitting-into area to increase, the temperature rise in the motor is heightened thereby. Accordingly, there is a range for optimizing the number of inside ventilation passages in the motor. As a result of a ventilation and heat transfer analysis, it has been determined that an optimum range for the number of inside ventilation passages is 5–12.

Further, the ratio between the amount of heat being radiated from the stator core by passing through the stator frame and the amount of heat being transferred first to the inside air and then heat-radiated has an optimum range. The stator winding temperature varies due to this ratio of the heat radiation amount. In a case where the ratio of the heat radiation amount is set within a range of 0.4–0.65, the stator winding temperature is lowest, and so a high cooling performance in the motor can be obtained.

Further, the heat-radiating area of the heat radiation rib provided on the inner face in the inside ventilation passage has an optimum range. When the ratio of the fitting-into area between the stator frame and the stator core is in an optimum range of 1.5–5, a high cooling performance in the motor can be obtained.

What is claimed is:

1. A totally-enclosed motor comprising:

a stator core having a substantially smooth and continuous outer circumferential surface and having a stator winding;

a substantially cylindrical stator frame contacting the substantially smooth and continuous outer circumferential surface of said stator core, while providing a plurality of inside ventilation passages which are spaced with a predetermined interval in a circumferential direction and which extend continuously in an axial direction, said stator frame having a plurality of outer heat radiation ribs extending radially and continuously in said axial direction on an outer circumferential surface thereof to define outer ventilation passages, at least one of said outer heat radiation ribs being on an outer face of each of said inside ventilation passages;

a rotor shaft;

a rotor core arranged within said stator core with a predetermined gap therebetween and fitted onto said rotor shaft and having a rotor winding thereon;

bearing members rotatably supporting said rotor shaft;

bracket members closing both ends of said stator frame, with said stator core and said rotor core located within said stator frame;

an interior fan arranged in said closed stator frame and driven by said rotor shaft, for circulating interior cooling air through said inside ventilation passages to cool said stator core and said rotor core; and an exterior fan arranged outside of said stator frame and driven by said rotor shaft, for circulating exterior cooling air through said outside ventilation passages, wherein at least one heat radiation rib of substantially rectangular cross-section extends radially and continuously in said axial direction on an inner face of each of said inside ventilation passages of said stator frame.

2. A totally-enclosed motor comprising:

a stator core having a substantially smooth and continuous outer circumferential surface and having a stator winding;

a substantially cylindrical stator frame contacting the substantially smooth and continuous outer circumferential surface of said stator core, while providing a plurality of inside ventilation passages which are spaced with a predetermined interval in a circumferential direction and which form projections on an outside surface of said stator frame, extending outwardly in a radial direction and continuously in an axial direction, said stator frame having a plurality of outer heat radiation ribs extending radially and continuously in said axial direction on an outer circumferential surface thereof to define outer ventilation passages, at least one of said outer heat radiation ribs being on an outer face of each of said inside ventilation passages;

a rotor shaft;

a rotor core arranged within said stator core with a predetermined gap therebetween and fitted onto said rotor shaft and having a rotor winding thereon;

bearing members rotatably supporting said rotor shaft;

bracket members closing both ends of said stator frame, with said stator core and said rotor core located within said stator frame;

an interior fan arranged in said closed stator frame and driven by said rotor shaft for circulating interior cooling air through said inside ventilation passages to cool said stator core and said rotor core; and an exterior fan arranged outside of said stator frame and driven by said rotor shaft for circulating exterior cooling air through said outside ventilation passages, wherein at least one heat radiation rib of substantially rectangular cross-section extends radially and continuously in said axial direction on an inner face of each of said inside ventilation passages of said stator frame, opposite said at least one heat radiation rib on the outer face of each of said inside ventilation passages.

3. A totally-enclosed motor comprising:

a stator core having a substantially smooth, and continuous outer circumferential surface and having a stator winding;

a substantially cylindrical stator frame contacting the substantially smooth and continuous outer circumferential surface of said stator core, while providing from five to twelve inside ventilation passages which are spaced with a predetermined interval in a circumferential direction and which extend continuously in an axial direction, said stator frame having a plurality of outer heat radiation ribs extending radially and continuously in said axial direction on an outer circumferential surface thereof to define outer ventilation passages, at least one of said outer heat radiation ribs being on an outer face of each of said inside ventilation passages;

a rotor shaft;

a rotor core arranged within said stator core with a predetermined gap therebetween and fitted onto said rotor shaft and having a rotor winding thereon;

bearing members rotatably supporting said rotor shaft;

bracket members closing both ends of said stator frame, with said stator core and said rotor core located within said stator frame;

an interior fan arranged in said closed stator frame and driven by said rotor shaft for circulating interior cooling air through said inside ventilation passages to cool said stator core and said rotor core; and an exterior fan arranged outside of said stator frame and driven by said rotor shaft for circulating exterior cooling air through said outside ventilation passages, wherein a plurality of inner heat radiation ribs extend radially and continuously in said axial direction on an inner face of each of said inside ventilation passages of said stator frame, the plurality of inner heat radiation ribs being distributed across the entire width of the inner face of each of said inside ventilation passages so as to provide an undulating shape to the entire inner face.

4. A totally-enclosed motor comprising:

a stator core having a substantially smooth and continuous outer circumferential surface and having a stator winding;

a substantially cylindrical stator frame contacting the substantially smooth and continuous outer circumferential surface of said stator core, while providing from five to twelve inside ventilation passages which are spaced with a predetermined interval in a circumferential direction and which extend continuously in an axial direction, said stator frame having a plurality of outer heat radiation ribs extending radially and continuously in said axial direction on an outer circumferential surface thereof to define outer ventilation passages, at least one of said outer heat radiation ribs being on an outer face of each of said inside ventilation passages;

a rotor shaft;

a rotor core arranged within said stator core with a predetermined gap therebetween and fitted onto said rotor shaft and having a rotor winding thereon;

bearing members rotatably supporting said rotor shaft;

bracket members closing both ends of said stator frame, with said stator core and said rotor core located within said stator frame;

an interior fan arranged in said closed stator frame and driven by said rotor shaft for circulating interior cooling air through said inside ventilation passages to cool said stator core and said rotor core; and an exterior fan arranged outside of said stator frame and driven by said rotor shaft for circulating exterior cooling air through said outside ventilation passages;

wherein at least one inner heat radiation rib of substantially rectangular cross-section extends radially and continuously in said axial direction on an inner face of each of said inside ventilation passages of said stator frame.

5. A totally-enclosed motor comprising:

a stator core having a substantially smooth and continuous outer circumferential surface and having a stator winding;

a substantially cylindrical stator frame contacting the substantially smooth and continuous outer circumferential surface of said stator core, while providing a plurality of inside ventilation passages which are spaced with a predetermined interval in a circumferential direction and which extend continuously in an axial direction, said stator frame having a plurality of outer heat radiation ribs extending radially and continuously in said axial direction on an outer circumferential surface thereof to define outer ventilation passages, at least one of said outer heat radiation ribs being on an outer face of each of said inside ventilation passages;

a rotor shaft;

a rotor core arranged within said stator core with a predetermined gap therebetween and fitted onto said rotor shaft and having a rotor winding thereon;

bearing members rotatably supporting said rotor shaft;

bracket members closing both ends of said stator frame, with said stator core and said rotor core located within said stator frame;

an interior fan arranged in said closed stator frame and driven by said rotor shaft for circulating interior cooling air through said inside ventilation passages to cool said stator core and said rotor core; and an exterior fan arranged outside of said stator frame and driven by said rotor shaft for circulating exterior cooling air through said outside ventilation passages, wherein at least one inner heat radiation rib of substantially rectangular cross-section extends radially and continuously in said axial direction on an inner face of each of said inside ventilation passages of said stator frame to provide a ratio between the heat radiating area of said heat radiation ribs and the contact area between said stator frame and said stator core in the range of 1.5 to 5.

6. A totally-enclosed motor comprising:

a stator core having a substantially smooth and continuous outer circumferential surface and having a stator winding;

a substantially cylindrical stator frame contacting the substantially smooth and continuous outer circumferential surface of said stator core, while providing a plurality of inside ventilation passages which are spaced with a predetermined interval in a circumferential direction and which extend continuously in an axial direction, said stator frame having a plurality of outer heat radiation ribs extending radially and continuously in said axial direction on an outer circumferential surface thereof to define outer ventilation passages, at least one of said outer heat radiation ribs being on an outer face of each of said inside ventilation passages;

a rotor shaft;

a rotor core arranged within said stator core with a predetermined gap therebetween and fitted onto said rotor shaft and having a rotor winding thereon;

bearing members rotatably supporting said rotor shaft;

bracket members closing both ends of said stator frame, with said stator core and said rotor core located within said stator frame;

an interior fan arranged in said closed stator frame and driven by said rotor shaft for circulating interior cooling air through said inside ventilation passages to cool said stator core and said rotor core; and an exterior fan arranged outside of said stator frame and driven by said rotor shaft for circulating exterior cooling air through said outside ventilation passages;

wherein at least one inner heat radiation rib of substantially rectangular cross-section extends radially and continuously in said axial direction on an inner face of each of said inside ventilation passages, and said interior fan, said exterior fan and said stator frame are proportioned such that the ratio between the amount of heat transferred by cooling air circulated by said interior fan through said inside ventilation passages and the amount of heat transferred by heat conduction through said stator frame is in the range of 0.4–0.65.

* * * * *